(12) United States Patent
Arnold

(10) Patent No.: US 10,743,559 B2
(45) Date of Patent: Aug. 18, 2020

(54) STAND-UP FUDGE KIT

(71) Applicant: Kelly Marie Arnold, Woodlawn, TN (US)

(72) Inventor: Kelly Marie Arnold, Woodlawn, TN (US)

(*) Notice: Subject to any disclaimer, the term of this patent is extended or adjusted under 35 U.S.C. 154(b) by 0 days.

(21) Appl. No.: 14/533,769

(22) Filed: Nov. 5, 2014

(65) Prior Publication Data
US 2016/0120203 A1 May 5, 2016

Related U.S. Application Data

(60) Provisional application No. 61/914,480, filed on Dec. 11, 2013.

(51) Int. Cl.
*A23G 1/00* (2006.01)
*A23G 1/20* (2006.01)
(Continued)

(52) U.S. Cl.
CPC ........... *A23G 3/0025* (2013.01); *A23G 3/346* (2013.01); *A23L 5/15* (2016.08); *A47J 36/025* (2013.01);
(Continued)

(58) Field of Classification Search
CPC ........ A23L 1/0255; A23L 1/0073; A23L 5/10; A23L 5/13; A23L 5/15; A23L 5/00; A23L 5/34; A23G 1/00; A23G 3/0004; A23G 3/0019; A23G 3/0025; A23G 3/0027; A23G 3/346; A23G 2220/10; A23G 2210/12; B65D 81/34; B65D 81/3415;
(Continued)

(56) References Cited

U.S. PATENT DOCUMENTS 2,984,570 A * 5/1961 Prell ................... A23G 3/28
222/1
4,844,917 A * 7/1989 DeLorimiere ....... A21C 15/005
141/114
(Continued)

OTHER PUBLICATIONS

Fudge NPL, published Aug. 27, 2009, http://www.justeasyrecipes.co.za/2009/08/27/microwave-fudge/.*
(Continued)

*Primary Examiner* — Drew E Becker
*Assistant Examiner* — Bryan Kim
(74) *Attorney, Agent, or Firm* — Furr Law Firm; Jeffrey Furr, Esq.

(57) ABSTRACT

A method for preparing no-mess fudge is provided. The process for preparing no-mess fudge may include a firming container and a stand-up container. The stand-up container retains a plurality of pre-measured fudge ingredients. The stand-up container may be sleeve providing a seal on one end and a flat base on the other. In preparation of making fudge, a user may cut vents and/or tear notches through the seal. The user may then heat the stand-up container for a sufficient time to properly prepare the plurality of ingredients. The user may then knead the stand-up container for a sufficient time to properly mix the plurality of ingredients. The user may then urge the plurality of ingredients out of the stand-up container and into the firming container so that the plurality of ingredients may set to fudge of a desired hardness.

1 Claim, 4 Drawing Sheets

(51) Int. Cl.
 *B65D 81/34* (2006.01)
 *A23G 3/34* (2006.01)
 *A47J 36/02* (2006.01)
 *A23L 5/10* (2016.01)
 *B65D 21/02* (2006.01)

(52) U.S. Cl.
 CPC ..... *B65D 81/3446* (2013.01); *B65D 81/3461* (2013.01); *B65D 21/0237* (2013.01)

(58) Field of Classification Search
 CPC  B65D 81/3446; B65D 81/3461; B65D 81/36; B65D 85/60
 See application file for complete search history.

(56) References Cited

U.S. PATENT DOCUMENTS

| | | | | |
|---|---|---|---|---|
| 5,140,121 | A * | 8/1992 | Pesheck | A23G 9/48 219/729 |
| 5,747,084 | A * | 5/1998 | Cochran | A21D 15/00 206/541 |
| 8,632,831 | B2 * | 1/2014 | Perry | B65D 81/2076 219/728 |
| 8,714,398 | B2 * | 5/2014 | Lewis | A47J 36/025 220/573.3 |
| 2005/0013905 | A1 * | 1/2005 | Hughes | B65D 75/5805 426/106 |
| 2005/0079251 | A1 * | 4/2005 | Bell | B65D 75/52 426/115 |
| 2005/0255200 | A1 * | 11/2005 | Takahagi | B65D 75/008 426/113 |
| 2010/0047403 | A1 * | 2/2010 | Johnson | B65D 75/008 426/113 |
| 2010/0136179 | A1 * | 6/2010 | Mochizuki | B65D 33/2508 426/87 |
| 2011/0318457 | A1 * | 12/2011 | Daniel | B65D 81/3294 426/115 |
| 2012/0207886 | A1 * | 8/2012 | Shulevitz | A21D 6/001 426/115 |
| 2012/0231115 | A1 * | 9/2012 | Bloir | A21D 10/005 426/21 |
| 2012/0279941 | A1 * | 11/2012 | Sprehe | B65D 33/2533 215/365 |
| 2014/0370162 | A1 * | 12/2014 | Vyas | B65D 25/08 426/115 |
| 2015/0056334 | A1 * | 2/2015 | Tutin | A21D 8/02 426/87 |
| 2015/0274400 | A1 * | 10/2015 | Lorence | B65D 81/3453 426/107 |

OTHER PUBLICATIONS

Farmbell NPL, published Dec. 7, 2010, https://chickensintheroad.com/farm-bell-recipes/snowman-fudge/ (Year: 2010).*

* cited by examiner

STAND-UP FUDGE KIT

CROSS-REFERENCE TO RELATED APPLICATION

This application claims the benefit of priority of U.S. provisional application No. 61/914,480, filed 11 Dec. 2013, the contents of which are herein incorporated by reference.

BACKGROUND OF THE INVENTION

The present invention relates to baking and, more particularly, an improved process for making fudge.

Currently, making fudge involves many steps and ingredients, use of a wide variety of measuring tools and mixing containers, and a resulting mess to clean up.

As can be seen, there is a need for a mess-free process of making fudge that does not involve measuring tools, mixing container, many steps or a lot of clean up.

SUMMARY OF THE INVENTION

In one aspect of the present invention, a stand-up container system for no-mess preparation of fudge, comprises: a plurality of ingredients at predetermined pre-measured ratios to prepare fudge of a desired taste; and a microwavable sleeve for retaining the plurality of ingredients, wherein the sleeve terminates in a seal end and an opposing base end; a separable seal disposed along the seal end so as to be positionable in an open position for receiving the plurality of ingredients and in a sealed position; and a flat base disposed along the base end, wherein the flat base is adapted to support the stand-up container in a vertically oriented position.

In another aspect of the present invention, a method of preparing fudge comprises: providing a stand-up container retaining a plurality of ingredients at sufficient pre-measured ratios to prepare fudge of a desired taste, wherein the stand-up terminates at a separable seal on one end and a flat base on the opposing end, wherein the separable seal is positionable in an open position for receiving the plurality of ingredient and in a sealed position, and wherein the flat base is adapted to support the stand-up container in a vertically oriented position; providing a firming container having a tray-like shape defining a firming surface; cutting portions of the seal end; heating the stand-up container for a first predetermined time; kneading the stand-up container for a second predetermined time; and urging the plurality of ingredients out of the stand-up container and on to the firming surface, whereby the plurality of ingredients set to make fudge of a desired taste.

These and other features, aspects and advantages of the present invention will become better understood with reference to the following drawings, description and claims.

DETAILED DESCRIPTION OF THE INVENTION

Figure 1:
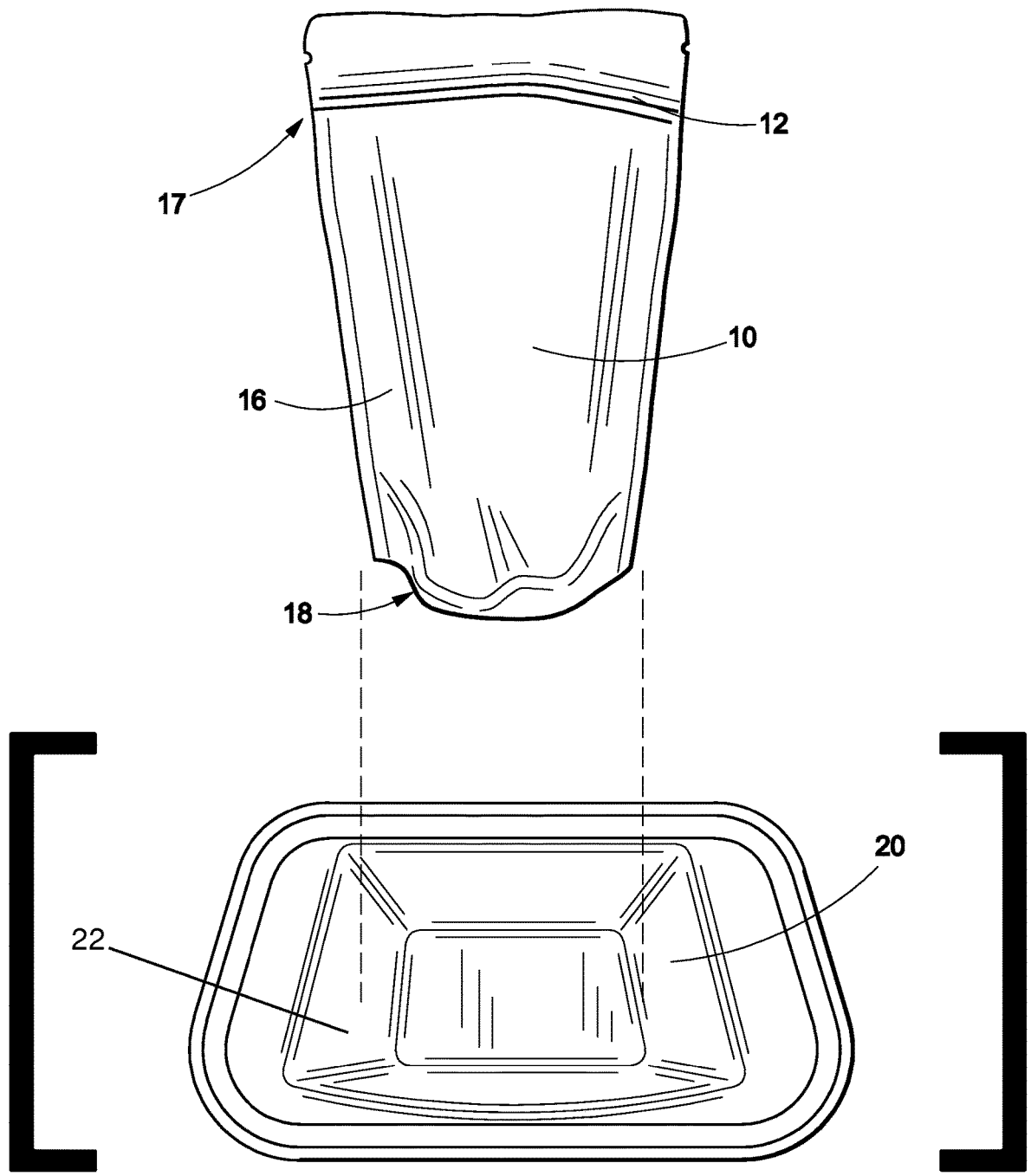
FIG. 1 is an exploded view of an exemplary embodiment of the present invention shown in FIG. 2.
Figure 2:
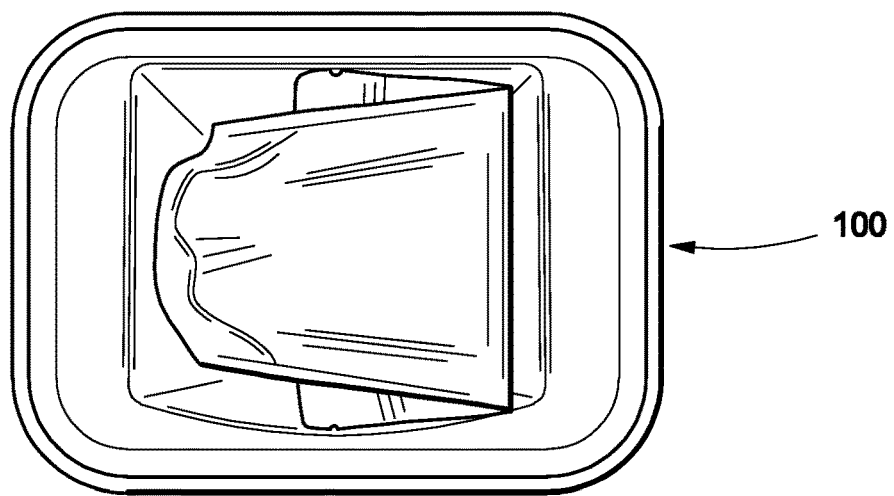
FIG. 2 is a top plan view of an exemplary embodiment of the present invention illustrating how a stand-up fudge kit may be distributed.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a process for preparing no-mess fudge. The process for preparing no-mess fudge may include a firming container and a stand-up container. The stand-up container retains a plurality of pre-measured fudge ingredients. The stand-up container may be a sleeve of microwavable film providing a seal on one end and a flat base on the other. In preparation of making fudge, a user may cut vents and/or tear notches through the seal. The user may then heat the stand-up container for a sufficient time to properly prepare the plurality of ingredients. The user may then knead the stand-up container for a sufficient time to properly mix the plurality of ingredients. The user may then urge the plurality of ingredients out of the stand-up container and into the firming container so that the plurality of ingredients may set to fudge of a desired hardness.

Referring now to FIGS. 1 through 5, the present invention may include a stand-up fudge kit 100. The stand-up fudge kit 100 may include a stand-up container 10 and a firming container 20. The firming container 20 may have a tray-like shape defining a firming surface 22. The firming surface 22 may have a wax, no-stick or the like surface coating. The firming surface 22 may be corrugated. The firming container 20 may inexpensively designed to be disposable.

The stand-up container 10 may include a mixture of a plurality of ingredients 30 at predetermined pre-measured ratios to make fudge of a desired taste. In certain embodiments, the plurality of ingredients 30 may include flavoring such as chocolate chip, nuts, raisins and the like.

Figure 3A:
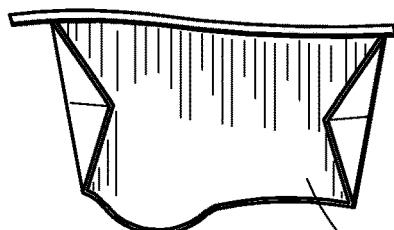
FIG. 3A is a top view of an exemplary embodiment of a stand-up container of the present invention.
Figure 3B:
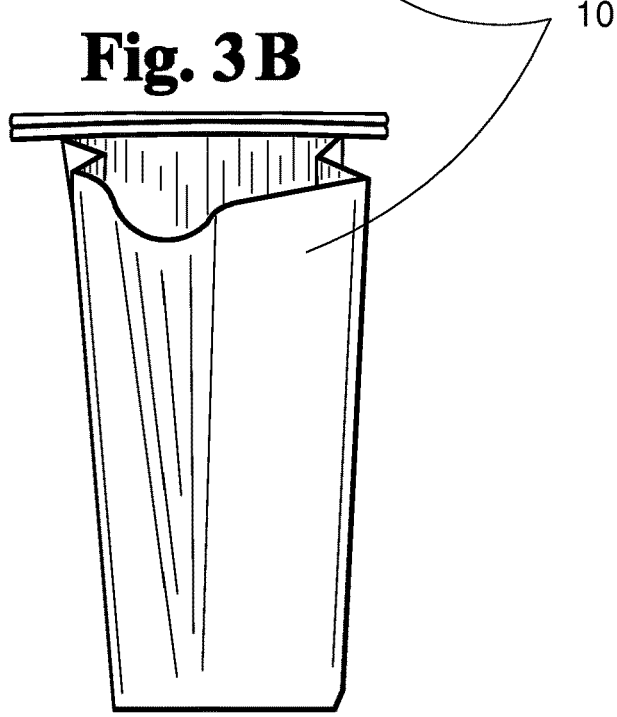
FIG. 3B is a side view of an exemplary embodiment of a stand-up container of the present invention.
Figure 4A:
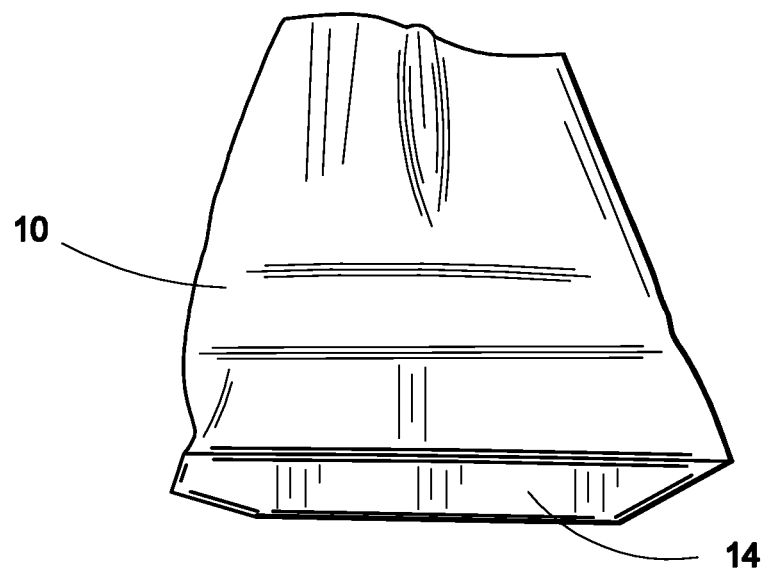
FIG. 4A is a perspective bottom view of an exemplary embodiment of the stand-up container of the present invention.
Figure 4B:
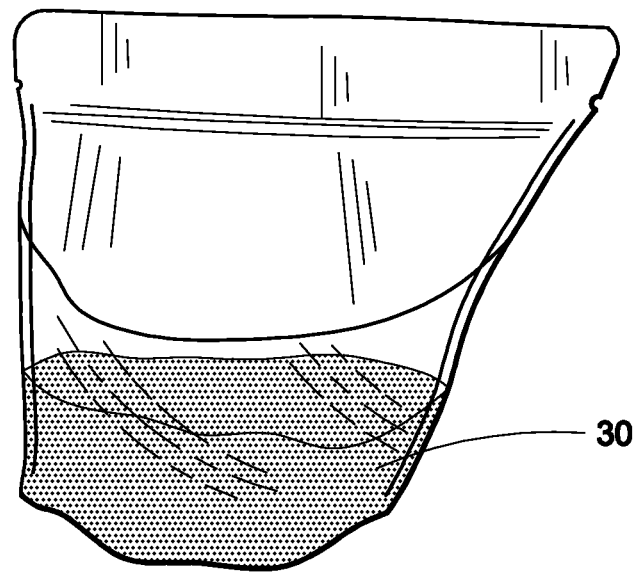
FIG. 4B is a perspective top view of an exemplary embodiment of the stand-up container of the present invention.
Figure 5:
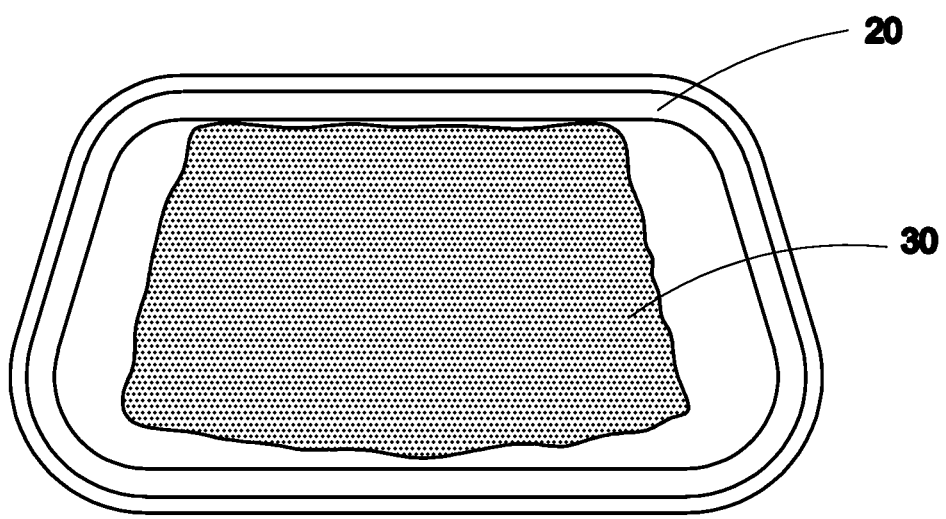
FIG. 5 is a top view of an exemplary embodiment of the present invention.

The stand-up container 10 may be made of a microwavable film forming a sleeve 16 having a seal end 17 and a base end 18. The sleeve 16 may form a cavity of sufficient size to hold the plurality of ingredients 30 therein. The seal end 17 may provide a separable seal 12. The separable seal 12 disposed along the seal end 17 so as to be positionable in an open position for receiving the plurality of ingredients and in a sealed position. The open position is illustrated in FIGS. 3A and 3B. In the sealed position the separable seal 12 may be an air tight interlocking seal variety, zipper-like closure, general separable seal or otherwise sufficient to prevent contamination of the plurality of ingredients 30. The base end 18 may provide a flat base 14. The flat base 14 may be suitable for supporting the stand-up container 10 in a vertically oriented position.

A method of using the present invention may include the following. The stand-up fudge kit 100 disclosed above may be provided. The user may cut vents, tear notches or the like through the seal end 17 so as to open a portion of the seal end 17 to the cavity. The user may then place the stand-up container 10 on the flat base 14 so that the stand-up container is in the vertical orientation within a microwave oven. Then the user may heat for a predetermined time to properly prepare the plurality of ingredients 30. The user may then knead the stand-up container 10 for a predetermined time to properly mix the plurality of ingredients 30. The user may unseal the seal 12. The user may then urge the plurality of ingredients 30 out of the stand-up container 10 through the open-positioned seal 12 and onto the firming surface 22 so that the plurality of ingredient may set to fudge of desired hardness. In certain embodiments, the user may add desired flavoring to the plurality of ingredients 30 setting in the firming container 20.

In certain embodiments, the stand-up container 10 need not be vertically oriented during the method of using disclosed above. In certain embodiments, the plurality of ingredients 30 may be heated by stovetop, open flame, heated water and the like.

It should be understood, of course, that the foregoing relates to exemplary embodiments of the invention and that modifications may be made without departing from the spirit and scope of the invention as set forth in the following claims.

What is claimed is:

1. A method of preparing fudge, comprising:
   providing a stand-up container comprising a sleeve made of microwaveable materials having a seal end and a base end where the sleeve forms a single cavity holding a plurality of ingredients at predetermined pre-measured ratios to prepare fudge, wherein the stand-up container terminates at an airtight separable seal on one end and a flat base on the opposing end, wherein the separable seal is an interlocking zipper closure positionable between an open position and a sealed position, and wherein the flat base is adapted to support the stand-up container in a vertically oriented position;
   providing a disposable firming container having a tray shape defining a corrugated firming surface circumscribed by sidewalls so as to define a recess and with a flat bottom to hold the stand-up container vertically where the firming surface has a no-stick surface coating;
   distributing the stand-up container nested within the recess of the firming container;
   opening a portion of the sealed end of the cavity;
   placing the stand-up container in the vertically oriented position;
   providing a microwavable oven for heating the stand-up container;
   placing the stand-up container on the flat base of the stand-up container for vertical orientation within the microwave;
   heating the stand-up container for a first predetermined time;
   kneading the stand-up container for a second predetermined time;
   after said heating and kneading, positioning the separable seal to the open position; and
   urging the plurality of ingredients out of the stand-up container and on to the firming surface, whereby the plurality of ingredients set to obtain the fudge.

* * * * *